(12) United States Patent
Bilobrov

(10) Patent No.: US 8,934,545 B2
(45) Date of Patent: Jan. 13, 2015

(54) EXTRACTION OF VIDEO FINGERPRINTS AND IDENTIFICATION OF MULTIMEDIA USING VIDEO FINGERPRINTING

(75) Inventor: Sergiy Bilobrov, Palo Alto, CA (US)

(73) Assignee: Yahoo! Inc., Sunnyvale, CA (US)

(*) Notice: Subject to any disclaimer, the term of this patent is extended or adjusted under 35 U.S.C. 154(b) by 409 days.

(21) Appl. No.: 12/706,658

(22) Filed: Feb. 16, 2010

(65) Prior Publication Data

US 2010/0211794 A1  Aug. 19, 2010

Related U.S. Application Data

(60) Provisional application No. 61/152,642, filed on Feb. 13, 2009.

(51) Int. Cl.
*H04N 11/02* (2006.01)
*G06T 1/00* (2006.01)

(52) U.S. Cl.
CPC ........................................ *G06T 1/00* (2013.01)
USPC ................................................... 375/240.16

(58) Field of Classification Search
CPC ................................................ G06K 9/00744
USPC .................................................... 375/240.16
See application file for complete search history.

(56) References Cited

U.S. PATENT DOCUMENTS

| 4,907,074 | A | * | 3/1990 | Hashimoto | 348/237 |
|---|---|---|---|---|---|
| 6,400,831 | B2 | * | 6/2002 | Lee et al. | 382/103 |
| 7,174,293 | B2 | | 2/2007 | Kenyon et al. | |
| 7,194,752 | B1 | | 3/2007 | Kenyon et al. | |
| 7,783,489 | B2 | | 8/2010 | Kenyon et al. | |
| 7,870,574 | B2 | | 1/2011 | Kenyon et al. | |
| 7,906,968 | B2 | * | 3/2011 | Hennig et al. | 324/318 |
| 8,019,132 | B2 | * | 9/2011 | Hara | 382/124 |
| 2004/0213446 | A1 | * | 10/2004 | Shams et al. | 382/129 |
| 2005/0265460 | A1 | * | 12/2005 | Jang | 375/240.29 |
| 2009/0034871 | A1 | * | 2/2009 | Keshet et al. | 382/274 |
| 2011/0128444 | A1 | * | 6/2011 | Oostveen et al. | 348/500 |

FOREIGN PATENT DOCUMENTS

WO   WO 2007148264 A1 * 12/2007

* cited by examiner

*Primary Examiner* — Dave Czekaj
*Assistant Examiner* — Leron Beck
(74) *Attorney, Agent, or Firm* — James J. DeCarlo; Greenberg Traurig, LLP

(57) ABSTRACT

A video fingerprinting algorithm extracts characteristic features from regions of interest in a media object, such as a video signal. The regions of interest contain the perceptually important parts of the video signal. A fingerprint may be extracted from a target media object, and the fingerprint the target media content may then be matched against multiple regions of interest of known reference fingerprints. This matching may allow identification of complex scenes, inserts, and different versions of the same content presented in different formats of the media object.

28 Claims, 5 Drawing Sheets

EXTRACTION OF VIDEO FINGERPRINTS AND IDENTIFICATION OF MULTIMEDIA USING VIDEO FINGERPRINTING

CROSS REFERENCE TO RELATED APPLICATIONS

This application claims the benefit of U.S. Provisional Application No. 61/152,642, filed Feb. 13, 2009, which is incorporated by reference in its entirety.

BACKGROUND

This invention relates generally to the identification and comparison of multimedia materials containing a series of visual images.

Audio and video fingerprinting techniques are often used for identification of multimedia content. A digital fingerprint is a compact representation of the characteristic features of multimedia content that can be used to categorize the content and distinguish it from perceptually different materials. The characteristic features of audio and video fingerprints should be robust and withstand against typical content distortions, noise, digital compression, and filtering. Simultaneously, these exclusive characteristics should also assure minimal false positive and false negative results, which lead to incorrect identification.

Unlike audio content, video content is three-dimensional, consisting of a two-dimensional image plane and a time axis. Due to the spatial nature of video content, it is subject to 2D transformations and distortions. During content production, the editing cycle may produce multiple versions of the same material with various spatial representations. Some video content may appear perceptually similar to the human eye, yet contain significantly different spatial composition, which results in varying image pixel values. Typical examples of these variations include widescreen and full screen editions of the same video content. However, variations can also occur from cropping, rotation, and affine transformations as a result of compression or copying, for example, due to recording of the video content projected on a movie screen from varying angles.

During the production cycle of the video content, multiple methods of recording are currently used. Common methods of the content recording are shown in FIG. 2. The first category is based on recording a scene using apparatus with different zoom and aspect ratio, placing emphasis on a certain portion of a larger image. Typically, this produces two distinct version of video content. The first format is the full-screen, where only a confined part of the larger image is displayed on the screen. The visual image is produced by zooming on a chosen region of the larger image, then expanding the image to fit the typical television screen, usually with an aspect ratio of 4:3. A second possible format is the wide-screen format, where the camera records the entire wider scene. While this format displays the entire scene, the produced image may be compressed horizontally or zoomed to fit the video frame commonly used for video capture, such as a film. The sub-category of this format is the anamorphic wide-screen display. This format fits a wide-screen display format into a standard full-screen, compressing the visual content horizontally while maintaining unchanged vertical resolution. Another sub-category is the masked wide-screen format where the whole image is resized proportionally and padded on the top and bottom by black bars. Visual display may vary greatly between the full-screen and wide-screen versions of the same visual content, with the wide-screen format displaying a greater range of horizontal visual content while maintaining identical or similar vertical range.

In addition to the spatial distortions and changes, the edited movie may also contain overlays, logos, banners, closed captions, and fragments of other movies embedded as picture-in-picture. Human viewers usually ignore these irrelevant parts of the visual content and concentrate on the perceptually significant elements regardless of the video format and its aspect ratio. Existing video fingerprinting techniques are unable to differentiate between perceptually relevant content and insignificant elements and insets during extraction of the characteristic features of a series of visual images. Due to this lack of perceptual versatility, existing fingerprinting algorithms must conduct analysis of the whole visual image to determine the regions of interest for identification purposes, since whether the regions are perceptually relevant has no impact on their usefulness for identification purposes.

SUMMARY

One method of detecting regions of interest for fingerprinting comprises analyzing key video frames and continuous scenes. Key frames usually represent the beginning of a new scene where the image content changes rapidly. The set of pixels within key frames where content is different usually represent the regions of interest. The comparison of key frames also allows the identification of the static parts of the movie that are common to all scenes in a particular time interval. If the elements are not changing their shape and location on the screen for a continuous sequence of key frames, then most likely these objects are not part of the actual visual content and were embedded into the movie stream afterwards. Such elements may include logos, banners, information bars, and blank areas around the actual image. The fingerprint generation process can crop or shade these elements during the pre-processing stage and therefore minimize their contribution on produced feature vectors of the video content. The errors in detection and removal of such static objects have less effect on the quality of the generated fingerprints, as the algorithm may remove identical elements from similar content to produce comparable fingerprints for all copies of the content.

In addition to detecting the aforementioned static elements, another method may be used to detect boundaries of actual scenes within the movie. Some movies may contain multiple regions of interest containing parts of the movie that change independently. Some of them may represent distinct elements added to the video as a result of editing, and include picture-in-picture, animated logos, split screens, etc. Analysis of the slow-changing movie frames, which lay in between key frames, allows detection of content that was embedded into the movie during the processing and editing stages. This detection method is based on the comparison of the level of local changes with the level of changes in the whole image. An abrupt change of a localized image area in contrast to the slow variations of the entire picture suggests that the localized area is changing independently from the rest of the image, and vice versa. This localized variation is characteristic of production stage editing additions, such as picture-in-picture or animated logos.

The detailed analysis of the local changes can provide long term statistics for a set of pixels gathered along a time axis, motion trajectories, contour lines, and gradient vectors. The time axis is perpendicular to the image plane and characterizes how each image pixel independently changes in time. The time axis can be considered the third dimension for the video content. The gradient vector points in the direction of the greatest change of pixel intensity in the 2D (spatial gradient) or 3D (spatio-temporal gradient). Large spatial gradient values are typical for the edges of captured and embedded objects as well as regions of interest. Repetitive detection of a common shape bounded by large gradient as well as divergence of the gradient field across multiple frames of an image area suggests that this area is a region of interest.

An alternate method of detection of the regions of interest is based on analysis of motion trajectories. These trajectories point in the direction of the smallest changes in the 3D spatio-temporal space and point to the direction of movement of individual objects and elements of the video content. There are numerous algorithms for the motion estimation based on the spatio-temporal filtering, edge-detection, point-correspondence, cross-correlation, etc. Motion estimation is widely used in video compression algorithms to increase efficiency and can be obtained at a low computation cost directly from the compressed video stream. Some motion detection algorithms isolate individual moving objects and trace their position in time. The objects in the original content may move across the image plane (original objects move across the scene, camera pan) and change size (objects move towards or away from camera, camera zoom). Thus, the original (natural) objects move across the image plane and have continuous motion trajectories. The gaps in the object motion trajectory within a scene indicate that the object was covered by another object located in front of it or by the frame boundary. While such shielding and interruptions in the motion trajectories are common for natural scenes, the appearance, shape and location of the moving and shielding objects vary from scene to scene. In a long term the gaps in motion vectors and statistics of the changes of series of multiple scenes are distributed randomly and uniformly across the region breaking consistently only on image boundaries.

The largest region covering image boundaries represent the main region of interest of the movie. Contrary to the natural scene objects, secondary content added to the movie during an editing phase is limited to a static position and localized in relatively small area within the larger region of interest representing the whole image. The changes and movement of embedded objects are contained in the same area (usually having rectangular shape) and this area does not vary in size. In general, internal parts of the Region of Interest (ROI), which include statistically admissible gaps or breaks in motion and gradient trajectories, are likely areas where the original video image was altered. Moreover, the ROI may contain another ROI. Each of these ROIs may be extracted and processed separately in categorical order, starting from the largest. In the case of multiple ROIs, the number of regions selected for fingerprinting within the visual image may depend on the required level of detail to be contained in the fingerprint.

To obtain an acceptable level of similarity between the target and database content, the content may first be scaled properly. Once the ROIs are isolated, the visual content may be normalized and transformed into images with the same resolution and aspect ratio for further evaluation. However, possible errors in the detection of ROI boundaries may cause significant variations in the actual content aspect ratio and image resolution even after ROI normalization and conversion them into images of the same size and resolution. The size, orientation and aspect ratio of the selected regions of interest, including the main (largest) region of interest may depend greatly on the format of the processed video stream. For example, visual content can be stored as anamorphic on the master copy, yet displayed through a lens to produce a wide-screen end result. This would result in the fingerprint database reference to be coded in condensed horizontally anamorphic format while the subject of the fingerprint analysis to be the full-screen version with similar horizontal extent (and vice versa).

Typically, the information about pixel aspect ratio and the aspect ratio of the movie frame are stored in the movie stream, though this information is often misleading. This may lead to errors while decoding and expanding of the anamorphic content to its original dimensions. For example, the full-screen version contains only a part of the larger wide-screen version. In general, the exact locations of the matching sub-region of the full-screen and wide-screen versions of the same content are not known. The full-screen version may represent any sub-regions of the wider version, not only its central part. Furthermore, the horizontal position of the matching regions may change from one scene to another or even gradually vary within a scene due to horizontal panning.

The proper comparison of the normalized regions may involve a method that is invariant to moderate variations in scale, aspect ratio, and shift of the compared images. In one embodiment, to scale and shift invariant matching, a comparison of log-scaled magnitude of FFT coefficients is performed. This approach, also known as Fourier-Mellin transformation, is based solely on the magnitude of the spectral components and completely ignores the phase. However, as proved by Oppenheim, the phase may have a useful contribution in the image reconstruction from the spectral data, and thus can be used for reliable identification of the visual information. The feature vectors produced without accounting the phase are not discriminative, which can result in a high rate of false positives. At the same time, the feature vectors computed taking into consideration the phase are robust, but sensitive to scale and shift variations. An alternate approach is to implement a multi-resolution pyramid, which incorporates an algorithm that compares the visual content in the library with the target visual content with different scale and resolution. This approach may involve significant computational costs and memory requirements to store all data necessary to compare images with different resolutions and aspect ratios.

In accordance with embodiments of the invention, a fingerprinting method incorporates the shift and scale invariance of the spectral approach and the robustness of the methods based on multi-resolution pyramid. The shift and scale invariance is achieved by using low frequency spectral coefficients to extract features in one direction while applying the multi-resolution approach in another direction. In one embodiment, using the low frequency spectral coefficients, the fingerprinting algorithm can identify and isolate common traits of video content that has undergone a moderate transformation along the vertical axis. The robustness to significant scale and shift variations in the horizontal direction is achieved by fragmentation of the video content with different scale, followed by an in-depth analysis of the individual aspects. Instead of complex 3D multi-resolution pyramid comprising scale, horizontal and vertical shift dimensions, the algorithm may incorporate a simpler triangular-base representation of the scale and shift in only one (horizontal) direction. This approach reduces spatial complexity of the search algorithm from $O(n^3)$ typical for 3D multi-resolution pyramid to $O(n^2)$.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Described herein are systems and methods for identification and quantitative classification of visual content by means of extraction of its distinguishing features and matching them with corresponding features of reference content. These features are calculated based on the exclusive characteristics of that content and presented in compact form—a digital fingerprint. This fingerprint can be matched against a set of reference fingerprints (e.g., reference digital fingerprints stored in a database) to determine the identity and relative quality of the video content based on the distance between the query and database fingerprints. Any of a variety of matching techniques may be used, as appropriate, such as those described in U.S. patent application Ser. No. 10/132,091, filed Apr. 24, 2002, or U.S. patent application Ser. No. 10/830,962, filed Apr. 22, 2004, each of which is incorporated by reference herein. Due to the nature of the fingerprint extraction algorithms, the results of embodiments of the invention do not suffer from degradation of the video content due to editing, distortions, moderate rotation, or affine transformations.

Figure 1:
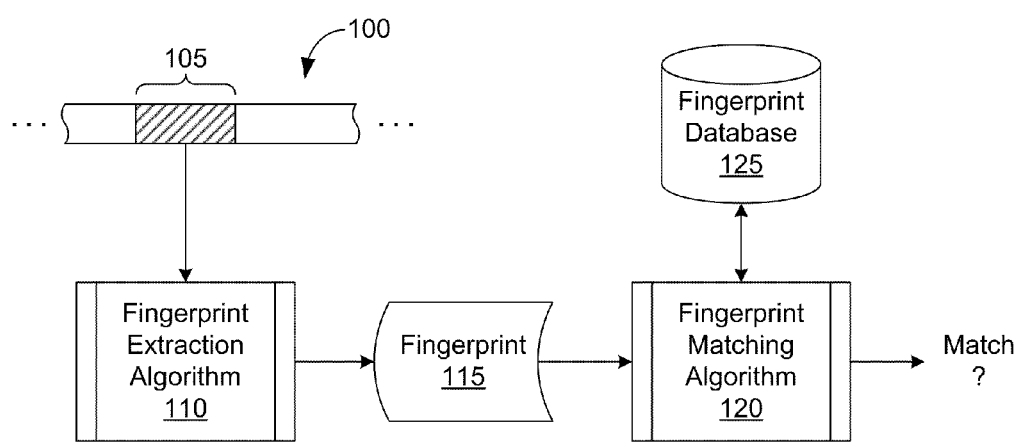
FIG. 1 is a schematic drawing of a process for extracting and using a fingerprint from a media object, in accordance with an embodiment of the invention.

Embodiments of the invention enable the extraction of characteristic information from a media object as well as the matching or identification of the media object using that extracted characteristic information. As illustrated in FIG. 1, a frame 105 of a media signal (e.g., a frame from a video signal) taken from a media object 100 is input into a fingerprint extraction algorithm 110. The media object 100 may be provided by any of a wide variety of sources. Based on one or more frames 105, the fingerprint extraction algorithm 110 generates one or more fingerprints 115 that are characteristic of the frames 105. Serving as a distinguishing identifier, the fingerprint 115 provides information relating to the identity or other characteristics of the sequence of frames 105 of the media object 100. In particular, one or more fingerprints 115 for the media object 100 may allow the media object 100 to be uniquely identified. Embodiments of the fingerprint extraction algorithm 110 are described in more detail below.

Once generated, the extracted fingerprint 115 can then be used in a further process or stored on a medium for later use. For example, the fingerprint 115 can be used by a fingerprint matching algorithm 120, which compares the fingerprint 115 with entries in a fingerprint database 125 (e.g., a collection of fingerprints from known sources) to determine the identity of the media object 100 from which the fingerprint 115 was generated.

The media object 100 may originate from any of a wide variety of sources, depending on the application of the fingerprinting system. In one embodiment, the media object 100 is sampled from a broadcast received from a media broadcaster and digitized. Alternatively, a media broadcaster may transmit audio and/or video in digital form, obviating the need to digitize it. Types of media broadcasters include, but are not limited to, radio transmitters, satellite transmitters, and cable operators. In another embodiment, a media server retrieves audio files from a media library and transmits a digital broadcast over a network (e.g., the Internet) for use by the fingerprint extraction algorithm 110. A streaming Internet radio broadcast is one example of this type of architecture, where media, advertisements, and other content is delivered to an individual or to a group of users. In another embodiment, the fingerprint extraction algorithm 110 receives the media object 100 from a client computer that has access to a storage device containing media object files. The client computer retrieves an individual media object file from the storage and sends the file to the fingerprint extraction algorithm 110 for generating one or more fingerprints 115 from the file. The fingerprint extraction algorithm 110 may be performed by the client computer or by a remote server coupled to the client computer over a network.

Embodiments of the video fingerprinting algorithm extract characteristic features of multiple regions of interest containing the most important and perceptually essential part of the visual images. The fingerprints of each region of interest of target content may be matched against multiple regions of reference content, thus allowing identification of complex scenes, inserts and different versions of the same content presented in wide-screen and full-screen formats.

In one embodiment of a method for identifying the region of interest, the variations of video content is calculated and analysed over given period of time. The fingerprinting algorithm calculates long term statistics of the changes in pixels across multiple frames and identifies the areas of maximum variation of the pixel values. Once the areas of maximized variation are determined, the boundaries and orientation of the area are estimated. If the area had distinct rectangular shape, the orientation may be defined by angle between its sides and the vertical or horizontal axis. If selected area has irregular shape, its orientation may be calculated as orientation of the smallest possible described rectangle covering the entire area of interest. Since the region orientation is ambiguous with respect to 90-degree rotation, its orientation is defined as a smallest angle by which the region has to be rotated to align it parallel to the vertical and horizontal axis.

In another embodiment, the fingerprinting algorithm identifies the spatial and spatio-temporal gradient vectors of the sampled video content and isolates the areas of maximum value. This may be achieved by calculating the divergence of the gradient field over an interval of frames. The divergence of spatio-temporal gradient, div G, is a scalar value, which is invariant under orthogonal transformations and thus independent of region orientation. The maximum values of the divergence of the gradient invariant concentrate along the edges of regions of interest which can be used for isolation of such regions.

Another method of detecting the regions of interest is to analyze the image along contour lines. The contour lines connect image points with equal values and therefore are perpendicular to the spatial gradient. The analog of the contour lines in spatio-temporal space is a level set or level surface that connects the points with similar values in 3D space. Typically, the contour lines have higher density along object boundaries. Areas repetitively bounded by continuous contour lines within a given time interval likely represent regions of interest. This concept applies to points of discontinuity formed by the fracture in the contour lines due to overlaps. Artificial objects embedded into video stream disrupt the contours of natural objects they intersect causing discontinuities. Identifying these points may be important for isolating the regions of interest. This is accomplished through a filtration process, which is done over a series of frames. Once the filtration is complete, the points of maximization form a distinct border around the region of interest. For example, if the maximized points form a rectangular perimeter, then the region of interest for fingerprinting exists within that rectangle.

In another embodiment, the isolation of the region of interest is achieved by tracking the motion trajectories of the video content. The motion trajectories are the changes in the pixels over time for a series of frames. When a motion trajectory is broken, it forms a disruption point. These disruption points occur at areas where the motion trajectories are interrupted by overlap of editing changes, such as picture-in-picture, logos, banners, and closed captions. The fingerprinting algorithm identifies the highest concentration of disruption points and uses a filtration system to form a boundary along these locations. This area depicts the borders of the region of interest.

Once the regions of interest are identified, they are transformed into a proper format that can be used for fingerprinting. The fingerprinting algorithm selects required number of regions of interest that will be analyzed. This selection may be based on the size, stability, and length of these regions. The selected regions of interest may have different shape and orientation. The most typical shape of the region of interest is a rectangle. Another typical shape is trapezoid which can be easily transformed into rectangle. The rectangular (as well as trapezoid) shape is easy to identify by its edges. The orientation of rectangular ROI is determined by orientation of its edges. While some regions of interest (like picture-in-picture) naturally have rectangular boundaries, others (like logos) may have an irregular shape. Any irregular objects may be extracted and padded to rectangular shape. The size and orientation of the described rectangle is selected to guarantee that produced rectangle contains the object entirely and padded area is minimal.

Once the key regions of interest are isolated, they are transformed into rectangular regions of identical size and orientation. This may be done through the use of standard methods of image rotation, scale, and skew transformations. In one embodiment, the produced regions of interest two sides oriented vertically and another two sides oriented horizontally resembling matrix I with N columns and M rows, where N and M are width and height of the ROI correspondingly. The series of video frames bounded by a region of interest over time interval $[t_1, t_2, \ldots, t_n]$ is represented as series of images $I=[I^1, I^2, \ldots, I^t]$. The fingerprint generation process extracts distinguishing features from the input spatio-temporal sequence I and maps the formed feature vector into output sequence $X=[X^1, X^2, \ldots, I^t]$. One region of interest A is matched to another region B by computing the distance between their fingerprints $X=F(A)$ and $Y=F(B)$. The distance between fingerprints X and Y reflects differences between the corresponding spatio-temporal regions A and B.

Figure 2:
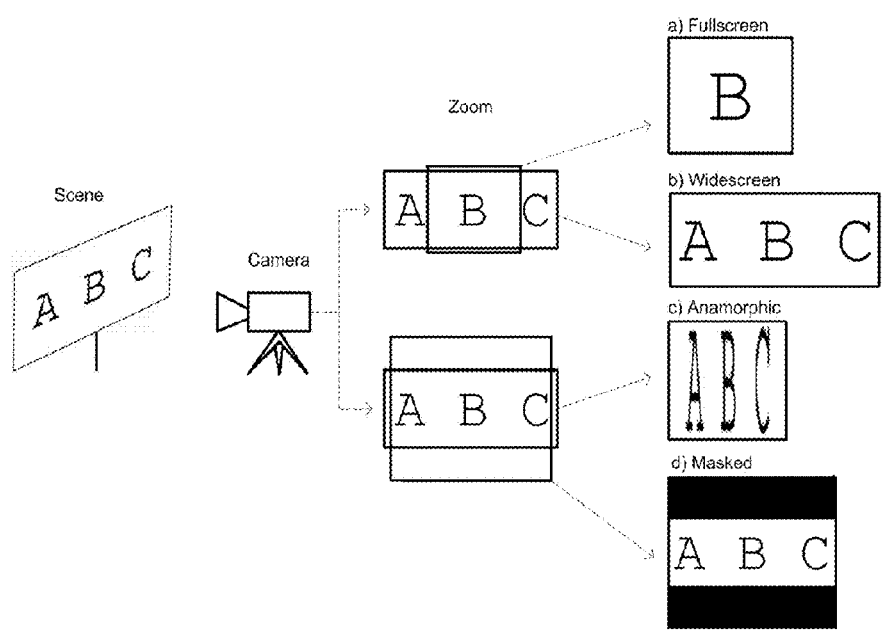
FIG. 2 is a schematic drawing of a system for capturing and saving a video signal into various video formats.
Figure 3:
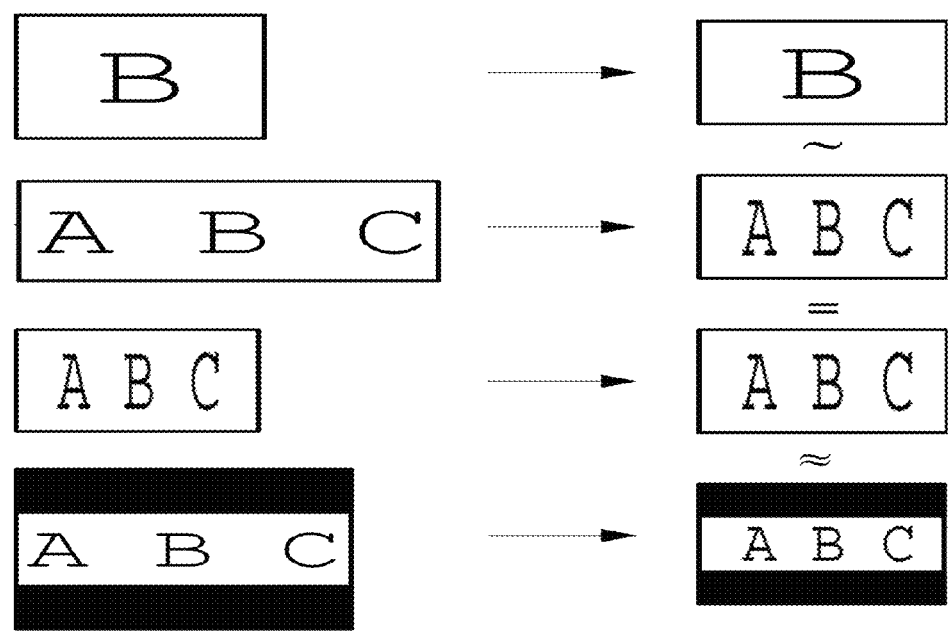
FIG. 3 illustrates an example process in which a frame from a video signal is scaled differently based on different underlying formats.
Figure 4:
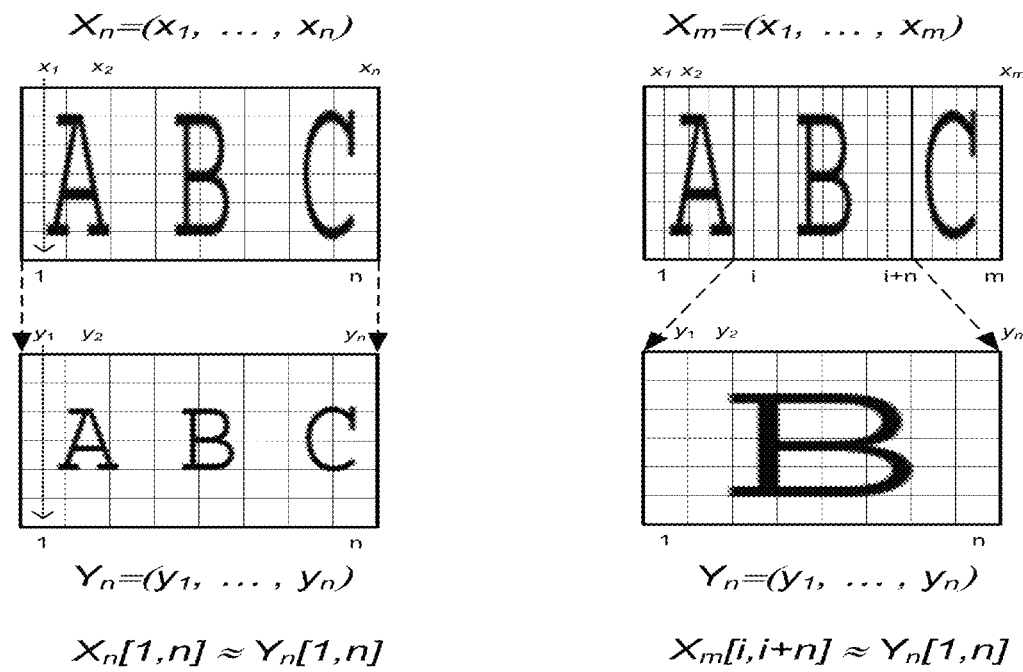
FIG. 4 illustrates an example process in which a frame from a video signal is scaled with different horizontal scaling.

Even when the regions of interest are scaled to the same size, this may not assure a flawless base for comparison. A region of interest in anamorphic format containing the widescreen version will provide different characteristics from a masked version of the same content. If the masked version is contained in the main region of interest representing the whole video frame, the region detection algorithm most likely will trim the top and bottom blank areas. However, if the masked version of the content is embedded into another video stream (picture-in-picture), the region recognition algorithm may detect outer boundaries of the area producing the region of interest that do contain blank areas of the masked image. As shown in FIGS. 2-4, the normalized and scaled regions of anamorphic and masked versions of the same content have identical horizontal scale and different vertical scale. In this case, the direct comparison of these two versions is possible by columns, assuming that every column is processed using scale and shift invariant transform. One possible process used in this situation is the Fourier-Mellin transform. The Mellin transform is scale invariant and can be approximated by calculation of the magnitude of the FFT of resampled data represented in logarithmic scale. An additional FFT magnitude calculation may be used to provide shift invariance. One disadvantage of this approach is that it is based on the magnitude spectrum and completely ignores the phase of the processed series. Different series of values may produce similar magnitude spectrum. This means that any method based on spectral magnitude becomes indiscriminative, and alternatives methods must be used to generate fingerprints. A possible alternative to magnitude spectrum is to use low-frequency spectral coefficients. These low-frequency coefficients are not as sensitive as the mid to high frequency coefficient to moderate shift and scale variations. Alternatively, the low frequency coefficients of any spectral or wavelet transform can be used rather than the FFT to increase the robustness of the fingerprints to shift and scale variations.

In another embodiment, the fingerprinting algorithm extends number of samples and resolution of low frequency coefficients by increasing size of the processed data buffer. The column feature extractor divides the entire video image into n columns $X_n=[x_1, x_2, \ldots, x_n]$. The algorithm places pixel values from a column $x_i$ consisting of m pixels into a larger processing buffer containing k*m elements. Once this is accomplished, the processing buffer is padded by null values and the low frequency spectral coefficients of the data in the buffer are calculated. This may be accomplished through the use of the FFT, DCT, or any other suitable transform.

An alternative method relies on filling the larger processing buffer by values selected from multiple columns. For the sake of clarity and example, the content may be fragmented into more than four columns, though the algorithm is not limited to any set preference of fragment numbers. The first four columns are selected and then reconstructed as a single vertical strip of larger size. This may be achieved by extracting the columns one-by-one from the original region of interest, in order, from left to right, and placing them in one single buffer containing 4*m elements. This processing buffer forms a larger base for feature extraction on a vertical axis. Once the data in processing buffer is transformed into frequency domain, the feature vector for the set of the first four columns is constructed and the processing algorithm selects the next set of four columns. The calculation of the vertical feature vectors recurs until all columns of the regions are processed.

The number of columns in the group selected for calculation of the vertical feature vector as well as the way how the groups overlap may vary. In one embodiment of the described technique, the processing group includes four columns organized from left to the right; the content of every column is ordered from top to the bottom; and on each iteration the algorithm shifts by one column to the right. Thus, processing groups overlap with the neighbouring groups by 75% and the image consisting of n' columns yields n=n'−3 vertical feature vectors.

An alternative method for calculating vertical feature vectors is to arrange columns in alternating fashion. The processing group may consist of four columns organized from left to the right; the content of every odd column is ordered from top to the bottom; and the content of every even column is ordered in the reverse order (from the bottom to the top). Thus, the processing buffer contains four columns with alternating order of pixels. Once the processing buffer is filled by column data in this alternating fashion, the spectral transform such as DCT is performed on the buffer data and separate sets of odd and even low frequency coefficients are selected. One possible advantage of this approach is that it allows the extraction of comparable feature vectors in instances where the video content flipped (mirrored) in horizontal direction. The DCT transform of the mirrored version arranged in an alternating fashion has the identical odd coefficients as the original version, while the even DCT coefficients have same absolute value, but the opposite sign. This allows matching both original and horizontally mirrored targets using the same set of vertical feature vectors in the reference data base.

As mentioned above, the vertical feature vectors constructed of low frequency spectral coefficients may be insensitive to moderate vertical scale and shift changes. In addition to the vertical shift and scale invariance, significant overlap of column groups horizontally makes the produced features insensitive to the horizontal shift of columns within the processing group. At the same time, these features are still sensitive to changes in horizontal scale. The vertical feature vectors of the target and reference content would match only if they have similar horizontal scale covering the same spread of the captured scene. The horizontal scale of vertical feature vectors depends on a width and, correspondingly, the inversely proportional to number of the columns. In turn, the number of columns that provides the required horizontal resolution may depend on the image format and its horizontal extent.

The example illustrated in FIG. 4 shows how a fragment of a wide-screen image matches its full-screen version. The wide-screen image X is decomposed into m vectors $X_m[1,m]$ and the full-screen image Y into n vectors $Y_n[1,n]$ of the same width. A sub-set $X_m[i,i+n]$ containing n vectors of the wide-screen image X matches the set $Y_n[1,n]$ of its full-screen version Y. If the image format and its aspect ratio are known, the image can be straight away divided into a number of vectors with required resolution. If information about the format of the target video is not accessible or available information is not reliable (for example due to improper encoding or intentional manipulations), the multi-resolution classifier consisting of several feature sets with different horizontal scale may be constructed.

Figure 5:
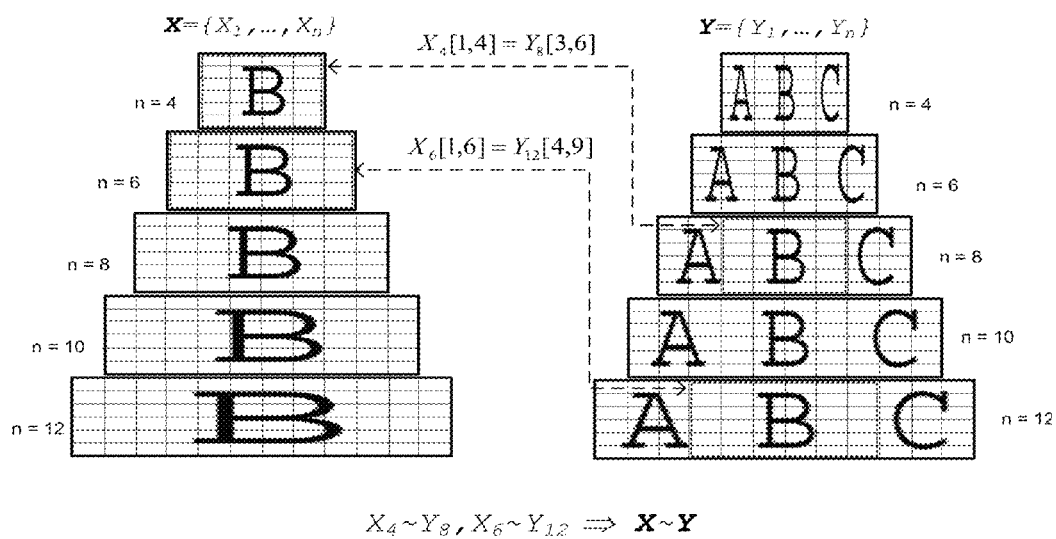
FIG. 5 is a drawing of a multi-resolution pyramid for matching a test fingerprint to a reference fingerprint, in accordance with an embodiment of the invention.

In an embodiment of the invention, the one-dimensional horizontal multi-resolution approach is employed to scale and isolate commonalities between the vertical feature vectors of content. For every processed image, the algorithm extracts multiple ordered sets of vertical feature vectors with different horizontal scale. The algorithm divides every image into specified number of columns of the same width and calculates vertical feature vectors. Once this is accomplished, the algorithm takes the next step; fragmenting the original image into an incremental amount of equal columns. As see in the example of FIG. 5, the number of columns added as well as number of produced vertical feature vectors on each step may be changing linearly. The resulting multi-resolution classifier $X=\{X_1, X_2, \ldots, X_L\}$ containing L layers may be presented in form of a triangle. Each row of the classifier triangle contains n-tuple $X_n=[x_1, x_2, \ldots, x_n]$ of feature vectors with scale S=1:n', where n' is number of columns used to produce $n^{th}$ layer. By employing the multi-scale classifiers of the target content and reference content, the algorithm can cross-reference all possible horizontal permutations that can be encountered due to editing or varied formatting.

In an embodiment of the invention, the scaling algorithm employs a non-linear scaling method. The non-linear scaling approach uses a difference system of fragmentation; the columns within the scale layers may be added on a non-linear basis. Regardless of the approach, linear or non-linear, a multi-resolution classifiers may be composed for a series of frames in the content. This means that each selected frame is stretched and analyzed by the algorithm, and a database for each permutation is constructed, recorded, and associated with every region of interest within the analyzed video sequence.

In an embodiment of the invention, the classifiers are composed only for key-frames of the analyzed video. This approach is also applicable to static images and series of images (slide show). Since the robustness of a single classifier may be insufficient for unique and reliable identification of the single video frame, the sequence of multiple classifiers may be calculated based on various properties of the image. In an embodiment, the series of classifiers is produced by cyclic shift of the data in processing buffers.

In an embodiment of this invention, the classifiers are composed for a series of consecutive frames of the analyzed video. The size of produced sequence of classifiers is reduced using tuple differential coding. In an embodiment of the invention, the difference between corresponding values of the consecutive classifiers, quantized and stored as an integer number of fixed size. Alternatively, the Huffman code table with code words of variable size could be used to further reduce the size of the sequence. The differential coding takes into account local changes of the extracted features in time. The more robust feature representation can be obtained by employing a long term analysis across multiple frames. In an embodiment of the invention, the difference encoding comprises calculation of the difference between the feature vectors of the current frame and the averaged feature vectors calculated for a number of preceding frames.

An alternative method of long term processing of time series of feature vectors comprises linear transformation and de-correlation of the values. Coefficients of such transformation can be obtained during the training phase. Alternatively, the Karhunen-Loève transform or a simplified approximation of such a DCT can be used. An embodiment of the invention uses a non-linear time scale, which increases the robustness of the generated fingerprints to variations in the playback speed of the video content. The feature values within the processing time window are re-sampled non-uniformly according to the selected non-linear scale. In one embodiment, the series of the features is sampled logarithmically and then de-correlated by applying DCT.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating a characteristic fingerprint for a multimedia signal, the method comprising:
   receiving, by a computing device, a media object, the media object comprising at least spatial components;
   identifying, by the computing device, a region of interest within the media object, the region of interest comprising a portion of the media object within a set of boundaries in the media object, the identifying of the region of interest comprises detecting the boundaries in the media object and comprising calculating statistics of changes in pixels across multiple frames and identifying areas of maximum variation of pixel values;
   transforming, by the computing device, the region of interest into a format for fingerprinting, the transforming based on size, stability, and length of the region of interest, the transforming comprising scaling, by the computing device, at least a portion of the region of interest into a plurality of sets of columns, each set of columns comprising a plurality of columns containing data from the region of interest at a different horizontal scaling thereof;
   computing, by the computing device, a plurality of sub-fingerprints for each of the sets of columns, each sub-fingerprint comprising characteristic information about one or more of the columns in the set of columns;
   combining, by the computing device, the sub-fingerprints into a characteristic fingerprint for the media object; and
   storing, by the computing device, the characteristic fingerprint in a storage medium.

2. The method of claim 1, wherein the media object comprises a video signal, and the media object further comprises a time component.

3. The method of claim 1, wherein the detected region of interest comprises at least two spatial components and a time component.

4. The method of claim 1, wherein the detecting of the boundaries in the media object comprises detecting a key frame in the media object.

5. The method of claim 1, wherein the detecting of the boundaries in the media object comprises performing motion estimation on the media object and inferring boundaries based on a gap in the motion of a feature within the media object.

6. The method of claim 1, wherein the detecting of the boundaries in the media object comprises computing a divergence of a gradient field in the media object.

7. The method of claim 1, wherein the detecting of the boundaries in the media object comprises detecting contour lines within the media object, wherein the contour lines are perpendicular to a spatial gradient in the media object.

8. The method of claim 1, further comprising: detecting a plurality of regions of interest, wherein one region of interest is within another.

9. The method of claim 1, wherein computing each sub-fingerprint for each of the set of columns comprises transforming the data from one or more columns into the frequency domain to produce a set of coefficients, and forming the sub-fingerprint from a plurality of the coefficients.

10. The method of claim 1, wherein computing each sub-fingerprint for each of the set of columns comprises transforming the data from multiple columns into the frequency domain to produce a set of coefficients, and forming the sub-fingerprint from a plurality of the coefficients.

11. The method of claim 10, wherein the transformed data is arranged in alternating spatial directions for consecutive sub-fingerprints.

12. The method of claim 1, wherein the computed sub-fingerprints for each of the set of columns are computed from horizontally overlapping columns.

13. The method of claim 1, further comprising: pre-processing the region of interest before the sub-fingerprints are computed, wherein the pre-processing comprises deemphasizing elements from the region of interest that are determined to be not part of a perceptual portion of the region of interest.

14. A computing device comprising:
   a processor;
   a storage medium for tangibly storing thereon program logic for execution by the processor, the program logic comprising computer instructions for:
   receiving, by the processor, a media object, the media object comprising at least spatial components;
   identifying, by the processor, a region of interest within the media object, the region of interest comprising a portion of the media object within a set of boundaries in the media object, the identifying of the region of interest comprises detecting the boundaries in the media object and comprising calculating statistics of changes in pixels across multiple frames and identifying areas of maximum variation of pixel values;
   transforming, by the processor, the region of interest into a format for fingerprinting, the transforming based on size, stability, and length of the region of interest, the transforming comprising scaling at least a portion of the region of interest into a plurality of sets of columns, each set of columns comprising a plurality of columns containing data from the region of interest at a different horizontal scaling thereof;

computing, by the processor, a plurality of sub-fingerprints for each of the sets of columns, each sub-fingerprint comprising characteristic information about one or more of the columns in the set of columns;

combining, by the processor, the sub-fingerprints into a characteristic fingerprint for the media object; and storing, by the processor, the characteristic fingerprint in the storage medium.

15. The computing device of claim 14, wherein the media object comprises a video signal, and the media object further comprises a time component.

16. The computing device of claim 14, wherein the detected region of interest comprises at least two spatial components and a time component.

17. The computing device of claim 14, wherein the detecting of the boundaries in the media object comprises detecting a key frame in the media object.

18. The computing device of claim 14, wherein the detecting of the boundaries in the media object comprises performing motion estimation on the media object and inferring boundaries based on a gap in the motion of a feature within the media object.

19. The computing device of claim 14, wherein the detecting of the boundaries in the media object comprises computing a divergence of a gradient field in the media object.

20. The computing device of claim 14, wherein the detecting of the boundaries in the media object comprises detecting contour lines within the media object, wherein the contour lines are perpendicular to a spatial gradient in the media object.

21. The computing device of claim 14, further comprising detecting a plurality of regions of interest, wherein one region of interest is within another.

22. The computing device of claim 14, wherein computing each sub-fingerprint for each of the set of columns comprises transforming the data from one or more columns into the frequency domain to produce a set of coefficients, and forming the sub-fingerprint from a plurality of the coefficients.

23. The computing device of claim 14, wherein computing each sub-fingerprint for each of the set of columns comprises transforming the data from multiple columns into the frequency domain to produce a set of coefficients, and forming the sub-fingerprint from a plurality of the coefficients.

24. The computing device of claim 23, wherein the transformed data is arranged in alternating spatial directions for consecutive sub-fingerprints.

25. The computing device of claim 14, wherein the computed sub-fingerprints for each of the set of columns are computed from horizontally overlapping columns.

26. The computing device of claim 14, further comprising pre-processing the region of interest before the sub-fingerprints are computed, wherein the pre-processing comprises deemphasizing elements from the region of interest that are determined to be not part of a perceptual portion of the region of interest.

27. A non-transitory computer readable storage medium for generating a characteristic fingerprint for a multimedia signal, the non-transitory computer readable storage medium comprising computer program code for execution by a processor, the computer program code for:

receiving, by the processor, a media object, the media object comprising at least spatial components;

identifying, by the processor, a region of interest within the media object, the region of interest comprising a portion of the media object within a set of boundaries in the media object, the identifying of the region of interest comprises detecting the boundaries in the media object and comprising calculating statistics of changes in pixels across multiple frames and identifying areas of maximum variation of pixel values;

transforming, by the processor, the region of interest into a format for fingerprinting, the transforming based on size, stability, and length of the region of interest, the transforming comprising scaling at least a portion of the region of interest into a plurality of sets of columns, each set of columns comprising a plurality of columns containing data from the region of interest at a different horizontal scaling thereof;

computing, by the processor, a plurality of sub-fingerprints for each of the sets of columns, each sub-fingerprint comprising characteristic information about one or more of the columns in the set of columns;

combining, by the processor, the sub-fingerprints into a characteristic fingerprint for the media object; and storing, by the processor, the characteristic fingerprint in a storage medium.

28. The non-transitory computer readable storage medium of claim 27, wherein the detecting of the boundaries in the media object comprises detecting by one or more of: detecting a key frame in the media object, performing motion estimation on the media object and inferring boundaries based on a gap in the motion of a feature within the media object, computing a divergence of a gradient field in the media object, and detecting contour lines within the media object, wherein the contour lines are perpendicular to a spatial gradient in the media object.

* * * * *